(12) United States Patent
Scholte

(10) Patent No.: US 7,426,219 B2
(45) Date of Patent: Sep. 16, 2008

(54) METHOD AND APPARATUS FOR REDUCING PACKET DATA MIXER DELAY

(75) Inventor: Alexander Martin Scholte, Chatswood (AU)

(73) Assignee: Avaya Inc., Basking Ridge, NJ (US)

( * ) Notice: Subject to any disclaimer, the term of this patent is extended or adjusted under 35 U.S.C. 154(b) by 950 days.

(21) Appl. No.: 10/376,077

(22) Filed: Feb. 26, 2003

(65) Prior Publication Data
US 2004/0165541 A1  Aug. 26, 2004

(51) Int. Cl.
*H04J 3/06* (2006.01)
(52) U.S. Cl. .................. 370/510; 370/321; 370/352; 370/503
(58) Field of Classification Search ............. 370/260, 370/352, 470, 321, 503, 510; 709/240
See application file for complete search history.

(56) References Cited

U.S. PATENT DOCUMENTS

| | | | | |
|---|---|---|---|---|
| 5,184,347 | A | | 2/1993 | Farwell et al. ............. 370/94.1 |
| 5,195,091 | A | | 3/1993 | Farwell et al. ............. 370/94.1 |
| 6,850,496 | B1 | * | 2/2005 | Knappe et al. ............. 370/260 |
| 7,277,962 | B2 | * | 10/2007 | Zhang et al. ............... 709/240 |
| 2002/0051465 | A1 | * | 5/2002 | Fang et al. .................. 370/470 |
| 2002/0075865 | A1 | * | 6/2002 | Lazarus ...................... 370/386 |

OTHER PUBLICATIONS

Thompson, Bruce, et al., "Tunneling Multiplexed Compressed RTP ("TCRTP")," Audio/Video Transport Working Group Internet Draft, Internet Engineering Task Force, Feb. 2002.
Schulzrinne, H., et al., "RTP: A Transport Protocol for Real-Time Applications," Audio/Video Transport Working Group, Jan. 1996.
Schulzrinne et al., "RTP: A Transport Protocol for Real-Time Applications", Network Workig Group, Request for Comments: 1889, available at http://www.faqs.org/rfc/rfc1889.txt, Jan. 1996, pp. 1-71.
Thompson et al., "Tunneling Multiplexed Compressed RTP ("TCRTP")", Audio/Video Transport Working Group, Internet Draft, available at http://www.ietf.org/internet-drafts/draft-ietf-avt-tcrtp-06.txt, Feb. 27, 2002, pp. 1-18.

* cited by examiner

*Primary Examiner*—Gerald Gauthier
(74) *Attorney, Agent, or Firm*—Sheridan Ross P.C.

(57) ABSTRACT

The present invention is directed to the reduction of delays introduced in connection with packet data mixing operations. In particular, in accordance with an embodiment of the present invention, communication endpoints providing packet data to a mixer are provided with packetization time adjustment information, in order to synchronize the arrival times of data from different communication endpoints. The packetization time adjustment information may be in the form of an amount of time or number of samples by which the endpoints packetization time should be shifted. The packetization time adjustment information may be provided as additional header information provided as part of a packet containing data transmitted to a communication endpoint from the mixer.

27 Claims, 3 Drawing Sheets

METHOD AND APPARATUS FOR REDUCING PACKET DATA MIXER DELAY

FIELD OF THE INVENTION

The present invention is related to reducing transmission delays caused by packet data mixers. In particular, the present invention is related to adjusting the times at which communication endpoints provide data packets for mixing with other data packets into a combined data stream.

BACKGROUND OF THE INVENTION

Packet data communication networks provide a convenient and economical means for delivering data between data endpoints. In certain instances, it is desirable to combine or mix data streams from different communication endpoints into a single data stream. For example, in connection with voice over internet protocol (VoIP) telephony applications, VoIP mixers can be used to enable conference calls between a number of endpoints. Packet data mixers are also useful in connection with improving the efficiency and capacity of communication networks by multiplexing individual packet data flows into aggregate flows. In particular, individual data streams can be bundled into a single aggregate flow for delivery between two subnetworks or mixers, reducing the total number of packets that must be handled by the communication network interconnecting the two mixers in delivering the data.

Although it is desirable to combine or mix data packets in such applications, the implementation of a data packet mixer generally introduces delays in the transmission of the data. In particular, where a number of communication endpoints provide data packets, a mixer must wait until each such data packet has arrived before an aggregated data packet can be formed and sent to a receiving communication endpoint. In a worst case scenario, an additional delay in the amount of half the packetization delay (i.e., the time period over which the mixer collects the data for aggregation into a single packet) is introduced. However, the introduction of such delays is undesirable, particularly in connection with voice telephony applications.

SUMMARY OF THE INVENTION

The present invention is directed to solving these and other problems and disadvantages of the prior art. According to the present invention, a packet data mixer provides communication endpoints with packetization time adjustment instructions, in order to synchronize the time at which the mixer receives individual data packets from different communication endpoints. The packetization time adjustment instructions may be provided as part of a reverse flow of data. In accordance with an embodiment of the present invention, the packetization time adjustment instructions are provided as part of a data packet header.

The packetization time adjustment instructions sent to a communication endpoint instruct the receiving endpoint to adjust the time at which the endpoint creates data packets. The instructed time adjustment is such that the data packets from the communication endpoints will arrive at the mixer at about the same time within each packetization period of the mixer. The time within a packetization period about which the packet arrival times are synchronized may be selected such that the amount of adjustment required by the various communication endpoints is minimized. In accordance with an embodiment of the present invention, the synchronized packetization time is equal to the average time of arrival of data packets received during a packetization period of the mixer.

DETAILED DESCRIPTION

Figure 1:
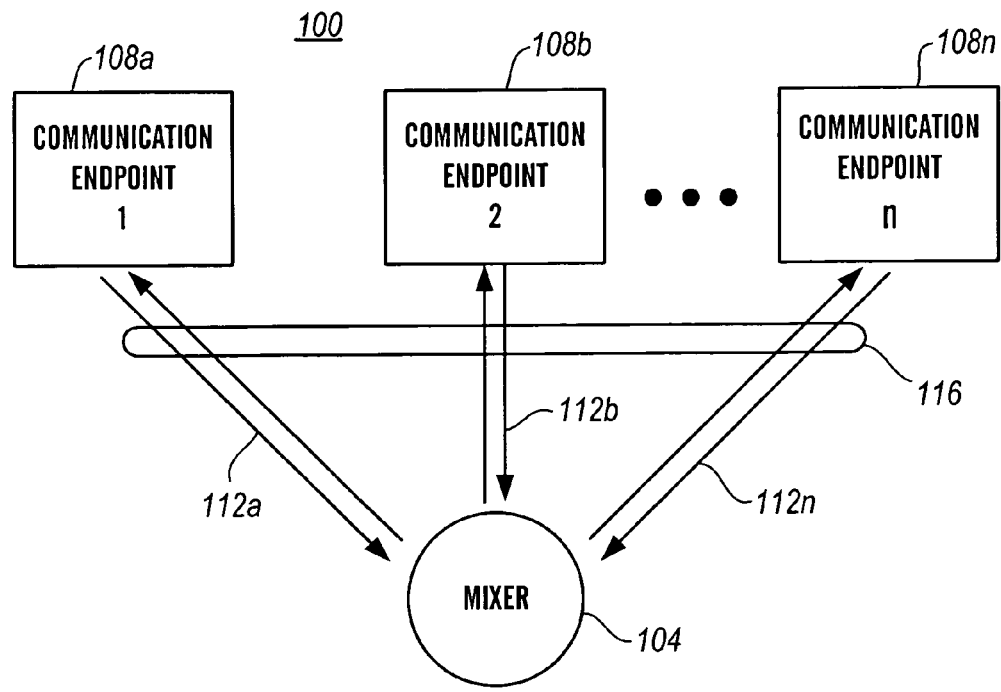
FIG. 1 is a block diagram of a communication system in accordance with an embodiment of the present invention.

With reference now to FIG. 1, a communication system arrangement 100 in accordance with an embodiment of the present invention is illustrated. The communication system 100 generally includes a packet data mixer 104, and a plurality of communication endpoints 108. As shown in FIG. 1, the packet data mixer 104 is generally in two-way communication with each of the communication endpoints 108.

The packet data mixer 104 may include any device that operates to combine or mix two or more data packets into a combined or super packet. Accordingly, examples of a packet data mixer 104 include a data multiplexer, including a real time transfer protocol (RTP) multiplexer, and a voice over internet protocol (VoIP) conferencer.

The communication endpoints 108 may include any device capable of sending and receiving packet data. Examples of communication endpoints 108 include general purpose computers, VoIP telephones, soft VoIP telephones running on general purpose computers, videotelephones, and analog to digital converters in combination with a telephone.

The communication channels or streams 112 are generally established and transmitted across a communication network 116. The communication network 116 may include one or more packet data networks, and may include the Internet or a private intranet.

As can be appreciated by one of skill in the art, many data communications conducted across a packet data network involve two-way communications. A particular example of such two-way communications are real time transfer protocol (RTP) communications, such as may be used in connection with the transmission of audio and video communications between two or more communication endpoints 108. Accordingly, a particular example of such communications includes VoIP telephony.

In connection with the transmission of voice and data between communication endpoints 108, such as may be performed using VoIP telephony techniques, it is desirable to permit calls between three or more endpoints to be conferenced together. This can be accomplished by mixing the data streams together. For example, with continued reference to FIG. 1, a conference call involving communication endpoint one 108a, communication endpoint two 108b, and communication endpoint n 108n may be accomplished by mixing together the data packets produced during a given packetization period from two of the endpoints 108 at the packet data mixer 104, and simultaneously providing the mixed packets to the third communication endpoint 108 as part of a single super or aggregated packet. Accordingly, the packet data mixer 104 in this example functions as a VoIP conferencer, and operates by placing data packets received from two transmitting communication endpoints 108 into a single packet, and sending the newly formed single packet to the receiving communication endpoint 108.

Another example is where the packet data mixer 104 functions as a data multiplexer, such as a real time transport protocol multiplexer. As an RTP multiplexer, the packet data mixer 104 bundles together individual data packets received at the packet data mixer 104 that are addressed to a communication endpoint or endpoints 108 on the same subnetwork. In particular, the packet data mixer 104 receives data packets from the sending communication endpoints 108, bundles those packets together into a super or aggregated packet, and sends the packet to a receiving communication endpoint 108. Alternatively, the super packet is sent to a complimentary packet data mixer 104 capable of deaggregating the super packet and providing the unbundled individual data packets to a recipient communication endpoint or endpoints 108.

Figure 2:
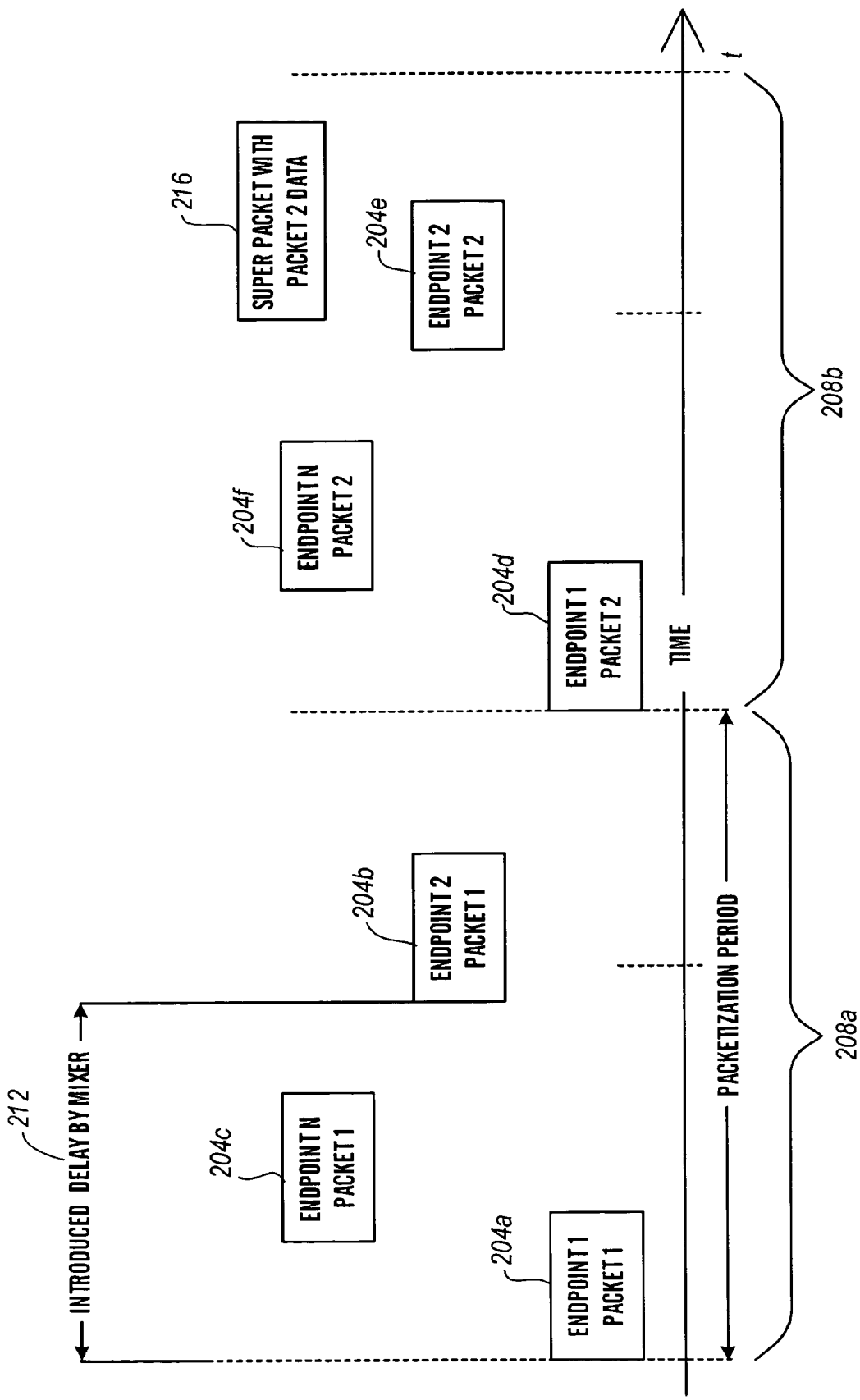
FIG. 2 illustrates the arrival of packet data at a mixer in accordance with an embodiment of the present invention.

With reference now to FIG. 2, the arrival of individual data packets at a packet data mixer 104 is depicted. In particular, FIG. 2 illustrates the arrival of individual data packets 204 over time. As can be appreciated by one of skill in the art, the packet data mixer 104 must wait for each individual packet 204 to be received from participating endpoints 108 during a packetization period 208 before an aggregated data packet containing each of the individual data packets 204 can be formed. Accordingly, the mixing operation results in the addition of a delay 212 in the transmission of data associated with an individual data packet 204 as part of a super packet 216. This additional delay 212 can be as much as one half the packetization period 208 of the packet data mixer 104. For example, for a 20 mS G.711 protocol packet data mixer 104, up to 10 mS of additional delay in the delivery of the data packets 204 can occur in a worst case scenario.

As will be explained in greater detail below, according to embodiments of the present invention, packetization time adjustment information may be provided to an individual communication endpoint in order to alter the time at which the communication endpoint 108 forms a packet of data relative to the packetization period, thereby changing the point within a packetization period of the packet data mixer 104 at which data from the communication endpoint 108 is received by a packet data mixer 104 in the system 100. Packetization time adjustment information may be individually provided to each communication endpoint 108 in communication with a packet data mixer 104, and may be combined with or inserted in data sent to the endpoints 108 from the packet data mixer 104. For example, a packet data mixer 104 comprising a VoIP conferencer may insert packetization time adjustment information in a super packet 216. In particular, a super packet 216 addressed to a first communication endpoint 108a and containing data from a second communication endpoint 108b provided as part of the second communication endpoint's first data packet 204b and containing data from an nth communication endpoint 108n provided as part of the nth communication endpoint's first data packet 204c may also communicate packetization time adjustment information to the first communication endpoint 108a. Similarly, super data packets 216 sent as part of a flow of data from the mixer to the second 108b and nth 108n communication endpoints may also include packetization time adjustment information for the respective communication endpoint 108b or 108n.

With respect to a packet data mixer 104 comprising an RTP multiplexer, super packets 216 containing data from data packets 204 are typically sent to a complimentary mixer. In addition, reverse flows of super packets are generally received from the complimentary mixer. The packet data mixer 104 proximate to a communication endpoint 108 may therefore provide packetization time adjustment information to an endpoint as part of or with individual data packets unbundled from a received super packet.

Figure 3:
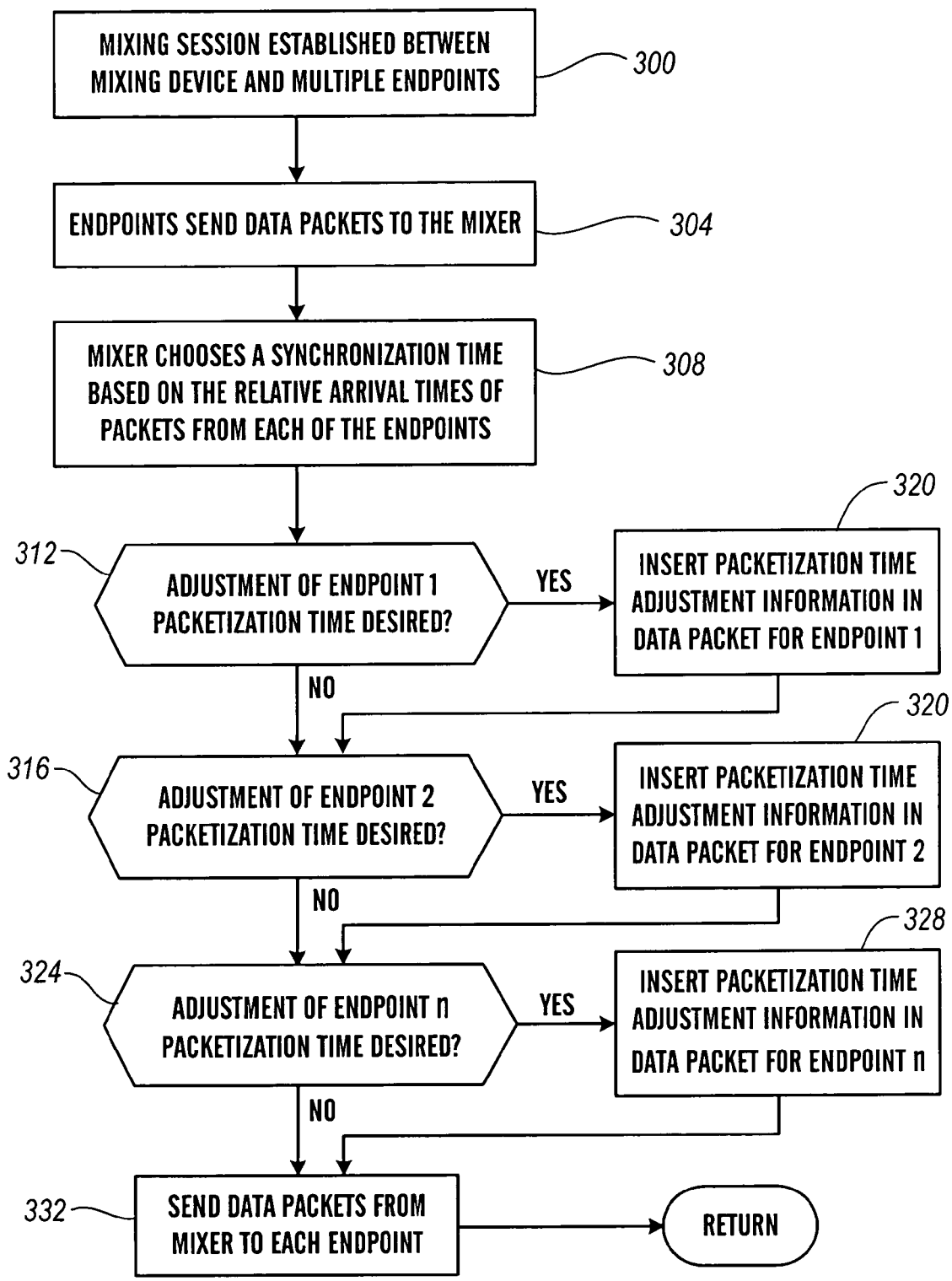
FIG. 3 is a flow chart depicting the operation of the system in accordance with an embodiment of the present invention.

With reference now to FIG. 3, the operation of an embodiment of the present invention is illustrated. Initially, in step 300, a mixing session is established between a mixing device 104 and multiple communication endpoints 108. For example, a conference call between endpoint one 108a, endpoint 2 108b, and endpoint n 108n is established through packet data mixer 104. The endpoints 108 may then send data packets to the packet data mixer 104 (step 304). On receipt of the data packets 204, the packet data mixer 104 chooses a synchronization time based on the relative arrival times of packets 204 from each of the communication endpoints 108 (step 308). According to an embodiment of the present invention, the synchronization time is selected as the average arrival time of the data packets 204. The use of an average data packet 204 arrival time as the synchronization time can reduce the overall amount by which the individual endpoints 108 must adjust their packet formation times. Alternatively, the synchronization time may be selected based on the clock used to time operation of the packet data mixer 104. In general, the synchronization time is selected to minimize the additional delay 212. Accordingly, the present invention may be used to reduce delays introduced by mixing data packets from different communication endpoints 108, even if all of the communication endpoints 108 are not capable of adjusting their packetization time in response to a packetization time adjustment instruction.

At step 312, a determination is made as to whether an adjustment in the packetization time with respect endpoint 1 108a is desired. For example, if the time of arrival of a data packet 204 from the first communication endpoint 108a is within a selected range of time about the selected synchronization time of the packet data mixer 104, then it may be determined that no adjustment in the packetization time of the first communication endpoint 108a is necessary. Alternatively, if the arrival time of a data packet 204 from the first communication endpoint 108a with respect to a packetization period 208 of the packet data mixer 104 is equal to the selected synchronization time, it may be determined that no adjustment in the packetization time of the first communication endpoint 108a is required. In such case, the system continues to step 316.

If it is determined that an adjustment to the synchronization time of the first communication endpoint 108a is desirable, packetization time adjustment information may be inserted in a data packet sent to the first communication endpoint 108a (step 320). In accordance with an embodiment of the present invention, the packetization time adjustment information comprises a signed number indicating the amount of time by which the packetization time of the communication endpoint 108a should be adjusted. For example, the packetization time adjustment information may be provided as a signed number indicating the number of milliseconds forwards or backwards that the packetization point used by the communication endpoint 108 should be adjusted. As another example, the time adjustment information could be provided as a signed number of samples that the packetization point of the communication endpoint 108 should be moved forwards or backwards. As can be appreciated, the units of the packetization time adjustment information are not important, provided that enough granularity is provided to make the necessary fine adjustments to the packetization point of the communication endpoint 108.

According to an embodiment of the present invention, the packetization times of communication endpoints 108 are brought towards a convergence point using predefined adjustment units. For example, if a packet from a communication endpoint 108 arrives late, that communication endpoint 108 may be instructed to shift its packetization time one unit forward. If a packet from a communication endpoint 108 arrives early, that communication endpoint 108 may be instructed to shift its packetization time one unit back. If a packet from a communication endpoint 108 arrives within a tolerance or threshold period about the synchronization time, then no time-adjustment instruction is sent. Using such an instruction stream, time adjustment instructions can be provided using only 2 bits of data.

According to another embodiment of the present invention, the speed with which packet arrival times converge towards the synchronization time can be increased by providing adjustment instructions that include information regarding the size of the adjustment that a communication endpoint 108 is to make. For example, a communication endpoint 108 may be instructed to shift its packetization time by an amount equal to one-half the difference between the packet arrival time and the synchronization time.

According to still another embodiment, the size of the time adjustment that a communication endpoint 108 is instructed to make is less than the amount of time required for the packet arrival time to exactly match the synchronization time. This is desirable because the effects of network jitter will often prevent convergence to the synchronization time in a single adjustment, but still allows the packetization time to converge quickly.

The packetization time adjustment information is, according to an embodiment of the present invention, provided as part of the packet header information sent from the packet data mixer 104 to the communication endpoint 108. In particular, the packetization time adjustment information can be added to super data packets 216 containing communication data from other communication endpoints 108 as part of a conferencing or multiplexing scenario. Accordingly, the header extension provisions defined for RTP flows can be utilized to enable communication endpoints 108 to receive the adjustment information. Furthermore, a communication endpoint 108 that is a legacy device, and does not have the capability to adjust its packetization point in response to information provided by a packet data mixer 104 in accordance with the present invention can simply ignore the extra information. In accordance with another embodiment of the present invention, the packetization time adjustment information can be provided in an alternative payload format or RTP profile definition. In accordance with yet another embodiment of the present invention, packetization time adjustment information could be sent out of band from the media stream to a communication endpoint 108 using a different protocol.

Upon receipt of packetization time adjustment information, a recipient communication endpoint 108 can make the required adjustment by adjusting the amount of information contained in the payload of the next or of a subsequent data packet sent to the packet data mixer 104, to enable a shift in the packetization time for the endpoint 108. Accordingly, the present invention is particularly suitable for use in connection with data transport protocols that allow for variable length data packets. In accordance with another embodiment of the present invention, the packetization time used by a communication endpoint 108 can be moved during a time that no data is being packetized by the endpoint 108. For example, in connection with a VoIP conference call, the packetization time of an endpoint 108 can be altered during a period of silence. In accordance with another embodiment of the present invention the packetization time used by a communication endpoint 108 can be moved during periods of silence where the period of silence can be decreased or increased by inserting or removing data.

With continued reference to FIG. 3, a determination may next be made as to whether an adjustment of the second communication endpoints 108b packetization time is desired (step 316). If an adjustment is desired, the packetization time adjustment for the second communication endpoint 108b may be sent from the packet data mixer 104 to the second communication endpoint 108b (step 320). After the communication of the packetization time adjustment to the second communication endpoint 108b, or if no adjustment of the packetization time of the second communication endpoint 108b is considered necessary, a determination is made as to whether an adjustment of the nth communication endpoints 108n packetization time is desired (step 324). If such an adjustment is desired, the packetization time adjustment information may be inserted in a data packet sent from the packet data mixer 104 to the nth communication endpoint 108n. After the insertion of the packetization time adjustment information in the data packet addressed to communication endpoint n 108n or if no adjustment to the nth communication endpoints 108n packetization time is desired, the data packets are sent from the packet data mixer 104 to each endpoint 108 (step 332).

Figure 4:
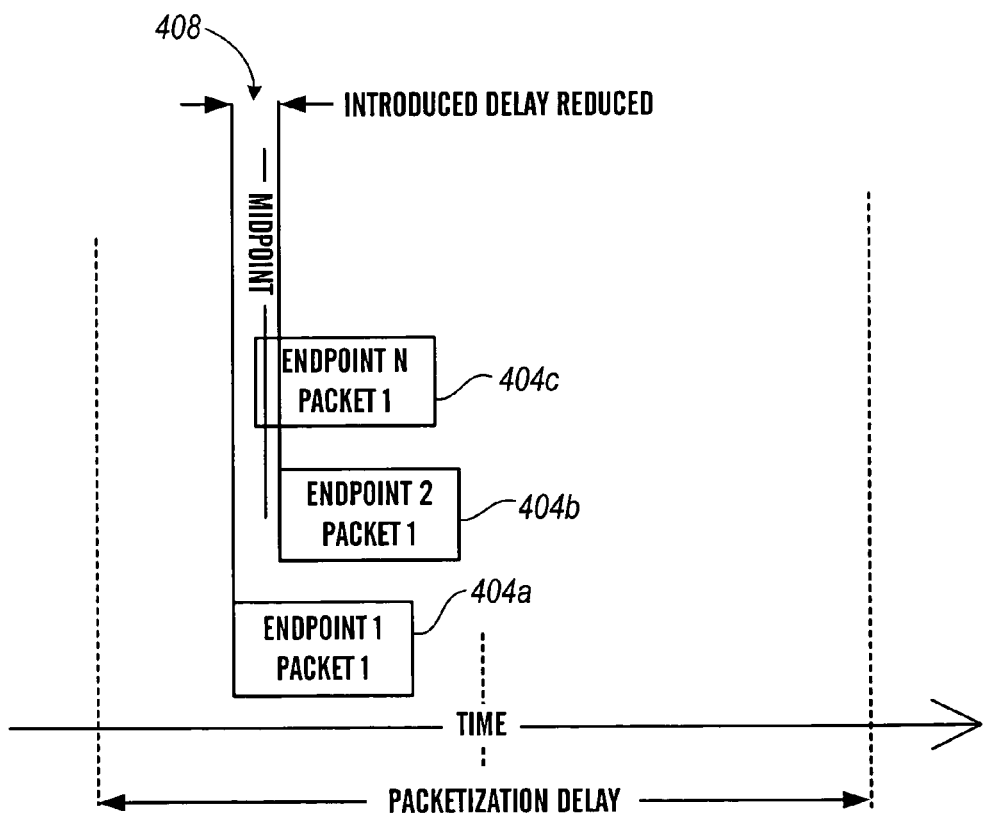
FIG. 4 depicts the arrival of packet data at a mixer after the provision of packetization time adjustment information to communication endpoints in accordance with an embodiment of the present invention.

With reference now to FIG. 4, the relative arrival times of data packets 404 after the provision of packetization time adjustment information to the respective endpoints 108 is illustrated. As shown in FIG. 4, the data packets 404 arrive at the packet data mixer 104 over a relatively narrow range of time 408. This range of time 408 represents the amount of delay introduced as a result of the mixing operation. Following receipt of the data packets 404, additional time adjustment information may be provided to the endpoints 108. As can be appreciated by a comparison of FIGS. 2 and 4, the provision of packetization time adjusted information to communication endpoints 108 can significantly reduce the delay added by a packet data mixer 104 to packet data communications.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for minimizing packet data mixer delay, comprising:

receiving at a packet data mixer at least a first data packet sent from a first communication endpoint and a second data packet sent from a second communication endpoint;

determining a relative arrival time of the at least first and second data packets at the packet data mixer;

generating in the packet data mixer a signal;

sending the signal to the first communication endpoint, wherein the signal instructs the first communication endpoint to adjust a packetization time by a first amount, and wherein the first time amount is determined from the relative arrival times of the first and second data packets; and in response to the signal, adjusting in the first communication endpoint the packetization time by the first amount, wherein as a result of adjusting in the first communication endpoint the packetization time the relative arrival time of a third data packet sent from the first communication endpoint and a fourth data packet sent from the second communication endpoint at the packet data mixer is changed as compared to the arrival time of the first and second data packets.

2. The method of claim 1, wherein the step of generating and sending the signal comprises inserting within a data packet sent from said packet data mixer to the first communication endpoint an instruction to the first communication endpoint to adjust the packetization time.

3. The method of claim 1, wherein the first and second data packets are received by the packet data mixer during a first packetization period.

4. The method of claim 1, wherein the step of determining a relative arrival time comprises determining an amount of time between the receipt of the first data packet received within a first packetization period and the second data packet received during said first packetization period.

5. The method of claim 4, wherein the second data packet comprises a last data packet received during the first packetization period.

6. The method of claim 4, wherein the step of signaling comprises signaling the first communication endpoint to adjust a packetization time by an amount about equal to one-half the time between the receipt of the first data packet and the second data packet.

7. The method of claim 1, wherein the step of signaling further comprises instructing the second communication endpoint to adjust a packetization time by a second amount.

8. The method of claim 1, further comprising:
selecting a standard packetization time, wherein the step of signaling comprises instructing the first communication endpoint to adjust a packetization time by an amount about equal to a difference between the packetization time and an arrival time of a data packet received from the sending device.

9. The method of claim 8, wherein the standard packetization time is selected as a mid-point between a time at which the first data packet is received during a packetization period and a time at which the second data packet is received during the packetization period, wherein the second data packet is a last data packet received during the packetization period.

10. The method of claim 9, wherein the standard packetization time is selected as a time of arrival of an intermediate data packet, wherein the intermediate data packet is received after the first data packet and before the second data packet.

11. The method of claim 1, wherein the first data packet is received as part of a super packet.

12. The method of claim 1, wherein the first communication endpoint comprises a telephone.

13. The method of claim 1, wherein the packet data mixer comprises at least one of a voice data conferencing device and a realtime transport protocol multiplexer.

14. The method of claim 2, wherein the first communication endpoint and the second communication endpoint are sending data packets to one another as part of a real time communication, and wherein the data packet in which the packet data mixer inserts the signal is a data packet that includes data for transmission from the second communication endpoint to the first communication endpoint as part of the real time communication.

15. A method for synchronizing data packets, comprising:
receiving from a first communication endpoint a first received data packet;
receiving from a second communication endpoint a second received data packet;
determining a synchronized packetization time;
determining and generating at least a first packetization time adjustment instruction; and
sending a first sent data packet to the first communication endpoint, wherein the first sent data packet includes data from at least the second received data packet and the at least a first packetization time adjustment instruction, wherein in response to the packetization time adjustment instruction the first communication endpoint changes the time at which the first communication endpoint forms a data packet relative to a packetization period.

16. The method of claim 15, wherein the step of determining at least a first packetization time adjustment instruction comprises calculating a difference between the synchronized packetization time and an actual arrival time of the first received data packet.

17. The method of claim 16, wherein in response to a receipt of the first sent data packet, the first communication endpoint adjusts a first communication endpoint packetization time by an amount indicated by the at least a first packetization time adjustment instruction.

18. The method of claim 17, wherein the first received data packet comprises a first quantity of data, and wherein a data packet formed by the first communication endpoint following the receipt of the first sent data packet contains a second quantity of data.

19. The method of claim 16, further comprising:
sending a second sent data packet comprising data from the first received data packet and at least a second packetization time adjustment to the second communication endpoint, wherein the step of determining a packetization time adjustment instruction further comprises calculating a difference between the synchronized packetization time and an actual arrival time of said second received data packet.

20. The method of claim 15, wherein the step of determining a synchronized packetization time comprises determining an average arrival time of the first and second received data packets.

21. The method of claim 15, wherein the first packetization time adjustment instruction comprises an instruction to shift a packetization time by at least a first predetermined unit of time forward or by at least a first predetermined unit of time back.

22. An apparatus for mixing data packets, comprising:
a communication interface, operable to place the apparatus in communication with a plurality of communication devices; and
a processor operable to perform instructions, the instructions including instructions for:
determining within a first packetization period a relative time of arrival of data packets received from the plurality of communication devices;
forming a super packet containing some of the data packets;

generating an instruction to at least one of the communication devices to adjust a packetization time, wherein the instruction is included in the super packet; and sending the super packet to the at least one of the communication devices to instruct the at least one communication device to adjust a relative packetization time.

23. The apparatus of claim 22, wherein the apparatus comprises a router.

24. The apparatus of claim 22, wherein said communication devices comprise telephony devices.

25. An apparatus for mixing data packets with reduced delay, comprising:

means for receiving data packets from at least first and second communication devices;

means for determining a relative arrival time of a first data packet received from said first communication device and a second data packet received from said second communication device; and means for signaling to at least the first communication device a packetization time adjustment signal derived from the relative time of arrival of the first and second data packets, wherein in response to receiving the packetization time adjustment signal the first communication device adjusts a relative packetization time.

26. The apparatus of claim 25, further comprising:

means for aggregating data received from a plurality of communication devices into a super packet, wherein said super packet includes said packetization time adjustment signal.

27. The apparatus of claim 26, further comprising:

means for transmitting said super packet to at least the second communication device.

* * * * *